US008924379B1

(12) United States Patent
Kim et al.

(10) Patent No.: US 8,924,379 B1
(45) Date of Patent: Dec. 30, 2014

(54) TEMPORAL-BASED SCORE ADJUSTMENTS

(75) Inventors: Hyung-Jin Kim, Sunnyvale, CA (US); Andrei Lopatenko, Cupertino, CA (US)

(73) Assignee: Google Inc., Mountain View, CA (US)

( * ) Notice: Subject to any disclaimer, the term of this patent is extended or adjusted under 35 U.S.C. 154(b) by 588 days.

(21) Appl. No.: 12/718,634

(22) Filed: Mar. 5, 2010

(51) Int. Cl.
*G06F 7/00* (2006.01)
*G06F 17/30* (2006.01)
*G06F 15/16* (2006.01)

(52) U.S. Cl.
USPC .......................................... 707/725; 707/727

(58) Field of Classification Search
USPC .................................................. 707/725, 727
See application file for complete search history.

(56) References Cited

U.S. PATENT DOCUMENTS

| | | |
|---|---|---|
| 5,265,065 A | 11/1993 | Turtle |
| 5,488,725 A | 1/1996 | Turtle |
| 5,696,962 A | 12/1997 | Kupiec |
| 5,920,854 A | 7/1999 | Kirsch et al. |
| 5,963,940 A | 10/1999 | Liddy et al. |
| 6,006,222 A | 12/1999 | Culliss |
| 6,014,665 A | 1/2000 | Culliss |
| 6,026,288 A | 2/2000 | Liddy et al. |
| 6,067,565 A | 5/2000 | Horvitz |
| 6,078,916 A | 6/2000 | Culliss |
| 6,078,917 A | 6/2000 | Paulsen et al. |
| 6,088,692 A | 7/2000 | Driscoll |
| 6,134,532 A | 10/2000 | Lazarus et al. |
| 6,182,066 B1 | 1/2001 | Marques et al. |
| 6,182,068 B1 | 1/2001 | Culliss |
| 6,185,559 B1 | 2/2001 | Brin et al. |
| 6,249,252 B1 | 6/2001 | Dupray |
| 6,285,999 B1 | 9/2001 | Page |
| 6,321,228 B1 | 11/2001 | Crandall et al. |
| 6,327,590 B1 | 12/2001 | Chidlovskii et al. |
| 6,341,283 B1 | 1/2002 | Yamakawa et al. |
| 6,353,849 B1 | 3/2002 | Linsk |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

McDonnell, Philip, A., 'Time Based Ranking,' U.S. Appl. No. 11/870,893, filed Oct. 11, 2007, 42 pages.

(Continued)

*Primary Examiner* — Greta Robinson
*Assistant Examiner* — Brian E. Weinrich
(74) *Attorney, Agent, or Firm* — Fish & Richardson P.C.

(57) ABSTRACT

Methods, systems, and apparatus, including computer programs encoded on computer storage media, for determining temporal based score adjustments are provided. One method includes receiving a query and obtaining a score for responsive documents. The method further includes adjusting the scores for the documents according to an age classification for one or more related queries for the documents. Another method includes storing popularity data for queries over time; identifying a query and associated extended queries from the popularity data, and storing time trend data associating the query and one or more periods of time with a respective extended query. Another method includes storing popularity data for queries over time, obtaining scores for documents responsive to a query submitted at a first time, and adjusting the scores for one the documents according to whether the first time is within a popularity change time window for one or more related queries for the documents.

9 Claims, 13 Drawing Sheets

(56) References Cited

U.S. PATENT DOCUMENTS

| | | |
|---|---|---|
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,877,404 B2 | 1/2011 | Achan et al. |
| 7,895,177 B2 | 2/2011 | Wu |
| 7,925,498 B1 | 4/2011 | Baker et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 * | 9/2011 | Franco et al. .................. 707/725 |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 * | 12/2011 | Hull et al. ...................... 707/725 |
| 8,073,772 B2 | 12/2011 | Bishop et al. |
| 8,086,599 B1 | 12/2011 | Heymans |
| 8,086,690 B1 | 12/2011 | Heymans |
| 8,090,717 B1 | 1/2012 | Bharat et al. |
| 8,156,111 B2 * | 4/2012 | Jones et al. ................... 707/721 |
| 8,224,827 B2 | 7/2012 | Dean et al. |
| 8,412,699 B1 * | 4/2013 | Mukherjee et al. ........... 707/713 |
| 8,458,165 B2 | 6/2013 | Liao et al. |
| 8,498,974 B1 | 7/2013 | Kim et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav et al. |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 * | 3/2005 | Tong et al. ............. 707/999.007 |
| 2005/0071741 A1 | 3/2005 | Acharya et al. |
| 2005/0102282 A1 | 5/2005 | Linden |

(56) References Cited

U.S. PATENT DOCUMENTS

| | | |
|---|---|---|
| 2005/0125376 A1* | 6/2005 | Curtis et al. ............... 707/1 |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0230040 A1 | 10/2006 | Curtis et al. |
| 2007/0005575 A1 | 1/2007 | Dai et al. |
| 2007/0005588 A1* | 1/2007 | Zhang et al. ............... 707/5 |
| 2007/0038659 A1 | 2/2007 | Datar et al. |
| 2007/0050339 A1* | 3/2007 | Kasperski et al. ..... 707/999.003 |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0192190 A1 | 8/2007 | Granville |
| 2007/0208730 A1 | 9/2007 | Agichtein et al. |
| 2007/0214131 A1* | 9/2007 | Cucerzan et al. ...... 707/999.005 |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0266021 A1* | 11/2007 | Aravamudan et al. ............ 707/5 |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1* | 5/2008 | Garg et al. ............. 707/999.004 |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulczewski |
| 2008/0189269 A1 | 8/2008 | Olsen |
| 2008/0208825 A1* | 8/2008 | Curtis et al. ........... 707/999.003 |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0070194 A1* | 3/2009 | Song ..................... 707/999.005 |
| 2009/0157643 A1 | 6/2009 | Gollapudi et al. |
| 2009/0182723 A1 | 7/2009 | Shnitko et al. |
| 2009/0228442 A1 | 9/2009 | Adams et al. |
| 2009/0287656 A1 | 11/2009 | Bennett |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2011/0064795 A1 | 3/2011 | Tosi et al. |
| 2011/0295844 A1 | 12/2011 | Sun et al. |
| 2012/0191705 A1 | 7/2012 | Tong et al. |

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Boldi, et al.; *The Query-flow Graph: Model and Applications*; CKIM '08, Oct. 26-30, Napa Valley, California, USA, pp. 609-617.

Boyan et al.; *A Machine Learning Architecture for Optimizing Web Search Engines*; Aug. 1996; Internet-based information systems—Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grčar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims; *Optimizing search engines using clickthrough data*; 2002; Proceedings of the ACM SIGKDD International Conference on Knowledge Discovery and Data Mining, p. 133-142.

Joachims et al., "Search Engines that Learn from Implicit Feedback"; Aug. 2007, IEEE Computer Society.

Kelly, et al.; *Implicit Feedback for Inferring User Preference: A Bibliography*; SIGIR Forum, vol. 37, No. 2 (2003), pp. 18-28.

Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

U.S. Patent Office, U.S. Appl. No. 11/556,143, filed Nov. 2, 2006, in Office Action mailed Apr. 20, 2011, 18 pages.

McDonnell, Philip, A., "Time Based Ranking," U.S. Appl. No. 11/870,893, filed Oct. 11, 2007, 42 pages.

(56) References Cited

OTHER PUBLICATIONS

Nicole, Kristen, *Heeii is StumbleUpon Plus Google Suggestions*, [online], Retrieved from the Internet http://mashable.com/2007/05/15/heeii/, 11 pages.

Lemire, Daniel, *Scale and Translation Invariant Collaborative Filtering Systems*, Published in Information Retrieval, 8(1), pp. 129-150, 2005.

U.S. Patent Office, U.S. Appl. No. 11/685,095, filed Mar. 12, 2007, in Office Action mailed Feb. 8, 2010, 31 pages.

U.S. Patent Office, U.S. Appl. No. 11/685,095, filed Mar. 12, 2007, in Office Action mailed Feb. 25, 2009, 21 pages.

U.S. Patent Office, U.S. Appl. No. 11/685,095, filed Mar. 12, 2007, in Office Action mailed Sep. 10, 2009, 23 pages.

U.S. Patent Office, U.S. Appl. No. 11/685,095, filed Mar. 12, 2007, in Office Action mailed Apr. 13, 2011, 31 pages.

Radlinski, et al., *Query Chains: Learning to Rank from Implicit Feedback*, KDD '05, Aug. 21-24, 2005, Chicago, Illinois, USA, 10 pages.

U.S. Patent Office, U.S. Appl. No. 11/556,086, filed Nov. 2, 2006, in Office Action mailed Jun. 23, 2010, 21 pages.

Schwab, et al., *Adaptivity through Unobstrusive Learning*, 2002, 16(3), pp. 5-9.

Stoilova, Lubomira et al., *GiveALink: Mining a Semantic Network of Bookmarks for Web Search and Recommendation*, LinkKDD '05, Aug. 21, 2005, Chicago, IL, USA, 8 pages.

W3C, URIs, URLs and URNs: Classification and Recommendations 1.0, Report from the joint W3C/IETF URI Planning Interest Group, Sep. 21, 2001, 8 pages.

Xiao, et al., *Measuring Similarity of Interests for Clustering Web-Users*, ADC, 2001, pp. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

Zeng et al., *Similarity Measure and Instance Selection for Collaborative Filtering*, WWW '03, May 20-24, 2003, Budapest, Hungary, pp. 652-658.

Zeng, et al., "Learning to Cluster Web Search Results", SIGIR '04, Proceedings of the 27th Annual International ACM SIGIR conference on research and development in information retrieval, 2004.

Soumen Chakrabarti, et al. "Enhanced Topic Distillation using Text, Markup tags, and Hyperlinks" ACM 2001, pp. 208-216.

Gabriel Somlo et al., "Using Web Hepler Agent Profiles in Query Generation", ACM, Jul. 2003, pp. 812-818.

Australian Patent Office Non-Final Office Action in AU App. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Gauch et al., "A Corpus Analysis Approach for Automatic Query Expansion and its Extension to Multiple Databases", ACM, 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. and L. Page, The Anatomy of a Large-Scale Hypertextual Web Search Engine, Computer Science Department, 1998.

International Search Report and Written Opinion for Application No. PCT/US2004/029615, dated Jan. 19, 2005, 8 pages.

Hungarian Patent Office, International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

Jones et al., "Pictures of Relevance: A Geometric Analysis of Similarity Measures", Journal of the American Society for Information Science, Nov. 1987, 23 pages.

Kaplan et al., "Adaptive Hypertext Navigation Based on User Goals and Context", User Modeling and User-Adapted Interaction 2, 1993; pp. 193-220, 28 pages.

Liddy et al., "A Natural Language Text Retrieval System With Relevance Feedback", 16th National Online, 1995, 3 pages.

Joachims, "Evaluating Search Engines Using Clickthrough Data", Cornell University, Department of Computer Science, Draft, Feb. 19, 2002, 13 pages.

Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

\* cited by examiner

TEMPORAL-BASED SCORE ADJUSTMENTS

BACKGROUND

This specification relates to scoring documents responsive to search queries.

Internet search engines provide information about Internet accessible resources (e.g., Web pages, images, text documents, multimedia content) that are responsive to a user's search query by returning a set of search results in response to the query. A search result includes, for example, a Uniform Resource Locator (URL) and a snippet of information for resources responsive to a query. The search results can be ranked (e.g., in an order) according to scores assigned to the search results by a scoring function.

The scoring function ranks the search results according to various signals, for example, where (and how often) query terms appear in the search results and how common the query terms are in the search results indexed by the search engine.

SUMMARY

In general, one innovative aspect of the subject matter described in this specification can be embodied in methods that include the actions of receiving a first query; identifying a plurality of documents responsive to the first query, and obtaining a respective score for each document, wherein each document is associated with a plurality of previously received related queries for which the document was responsive; adjusting the score for one or more of the plurality of documents according to an age classification for one or more of the related queries for the document, wherein the age classification is derived from one or more terms in the related queries; and ranking one or more of the plurality of documents according to the respective scores and adjusted scores for the documents. Other embodiments of this aspect include corresponding systems, apparatus, and computer programs recorded on computer storage devices, each configured to perform the operations of the methods.

These and other embodiments can each optionally include one or more of the following features. Adjusting the score for a particular document in the one or more documents can include determining a score adjustment for the particular document, the determining including: selecting a plurality of matching queries from the plurality of related queries for the particular document, wherein each matching query matches the first query; determining an age classification for each matching query according to any temporal terms of the query and determining an age classification for the particular document according to the classifications of the queries; and determining the score adjustment according to the age classification of the particular document; and adjusting the score for the particular document according to the score adjustment. Determining an age classification for a query can include classifying the query as new if one or more terms of the query are new temporal terms; classifying the query as old if one or more terms of the query are old temporal terms; and otherwise classifying the query as non-temporal. Determining the age classification for the particular document can include calculating a new count corresponding to a number of the matching queries that are classified as new, and calculating an old count corresponding to a number of the matching queries that are classified as old; classifying the document as new if the new count satisfies a threshold; and otherwise, classifying the document as old if the old count satisfies a threshold. The new count can be a weighted count wherein each new query is weighted by a weight derived from one or more quality of result statistics for the document and the query. The old count can be a weighted count wherein each old query is weighted by a weight derived from one or more quality of result statistics for the document and the query.

Determining the score adjustment can include determining a positive adjustment that increases the score by a factor when the document is a new document. The factor can be determined from the new count. Determining the score adjustment can include determining a negative adjustment that decreases the score by a factor when the document is an old document. The factor can be determined from the old count. The actions can further include determining that the first query is not an old query before determining the adjusted score.

In general, another innovative aspect of the subject matter described in this specification can be embodied in methods that include the actions of storing popularity data indicating a popularity of queries over time; identifying a first query from the popularity data, the first query comprising one or more terms; selecting one or more extended queries for the first query from the popularity data, each extended query including each term of the first query and one or more additional terms; storing time trend data for the first query for one or more time periods, the time trend data for the first query and a particular period associating the first query and the particular period with one of the extended queries. Other embodiments of this aspect include corresponding systems, apparatus, and computer programs recorded on computer storage devices, each configured to perform the operations of the methods.

These and other embodiments can each optionally include one or more of the following features. The actions can further include receiving the first query from a user during a first time period; identifying a first extended query associated with the first query and the first time period from the time trend data; and scoring documents responsive to the first query based, at least in part, on the first extended query. Scoring documents responsive to the first query based, at least in part, on the first extended query can include increasing a score of documents that include terms in the first extended query but not in the first query. Scoring documents responsive to the first query based, at least in part, on the first extended query can include increasing a score of documents that are associated with queries that include terms in the first extended query but not in the first query.

Identifying the first query includes identifying a query that has multiple spikes in popularity as indicated in the popularity data, wherein a spike in popularity occurs when a popularity of the query temporarily increases beyond a threshold amount. The popularity of a query can be derived from a number of times the query is submitted. The popularity of a query can be derived from a number of times users enter the query as a query refinement of an originally submitted query. The actions can further include calculating a popularity score for each of the extended queries for each of the one or more time periods and selecting one of the extended queries to associate with the first query for each of the one or more time periods according to the popularity scores, wherein selecting an extended query for a period includes selecting the extended query with a highest popularity score for the period. The popularity score for an extended query during a first period can be derived by dividing a number of times the extended query was submitted during the first period by the number of times the first query was submitted during the first period. The popularity score for an extended query during a first period can be derived by dividing a number of times the extended query was submitted as a query refinement during the first period by the number of times the first query was submitted during the first period.

In general, another innovative aspect of the subject matter described in this specification can be embodied in methods that include the actions of storing popularity data for one or more queries, the popularity data indicating changes in popularity of a query over time; receiving a first query submitted at a first time; identifying a plurality of documents responsive to the first query, and obtaining a respective score for each responsive document; adjusting the score for one or more of the plurality of documents according to whether the first time is within a popularity change time window for one or more related queries for the document, wherein the popularity change time window for a query is a reoccurring period of time during which a popularity of the query temporarily changes beyond a threshold amount; and ranking the plurality of documents according to the respective scores and adjusted scores for the documents. Other embodiments of this aspect include corresponding systems, apparatus, and computer programs recorded on computer storage devices, each configured to perform the operations of the methods.

These and other embodiments can each optionally include one or more of the following features. Adjusting the score for a particular document in the plurality of documents can include determining a score adjustment for the particular document, the determining including: determining that the first time is within one or more relevant popularity change time windows for the particular document, wherein each relevant popularity change time window corresponds to one of the related queries for the particular document; and selecting an appropriate score adjustment according to the popularity change associated with each of the one or more relevant popularity change time windows; and adjusting the score for the particular document according to the score adjustment. One or more of the popularity change time windows can correspond to a temporary spike in popularity for a query. An appropriate score adjustment can be a positive score adjustment that increases the score for the particular document by a factor when the one or more relevant popularity change time windows correspond to a temporary spike in popularity for the query. Each of the popularity change time windows can correspond to a temporary spike in popularity for a query or a temporary dip in popularity for a query. An appropriate score adjustment can be a negative score adjustment that decreases the score for the particular document by a factor when the one or more relevant popularity change time windows correspond to a temporary dip in popularity for the query. The popularity change time window can be a period that re-occurs each calendar year.

Particular embodiments of the subject matter described in this specification can be implemented so as to realize one or more of the following advantages. A search system can identify documents with more recent information from the text of queries associated with the documents. More recent documents can be assigned a higher rank. Documents can be ranked according to the popularity of their associated queries over time, or according to how well the documents satisfy particular queries at particular times.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
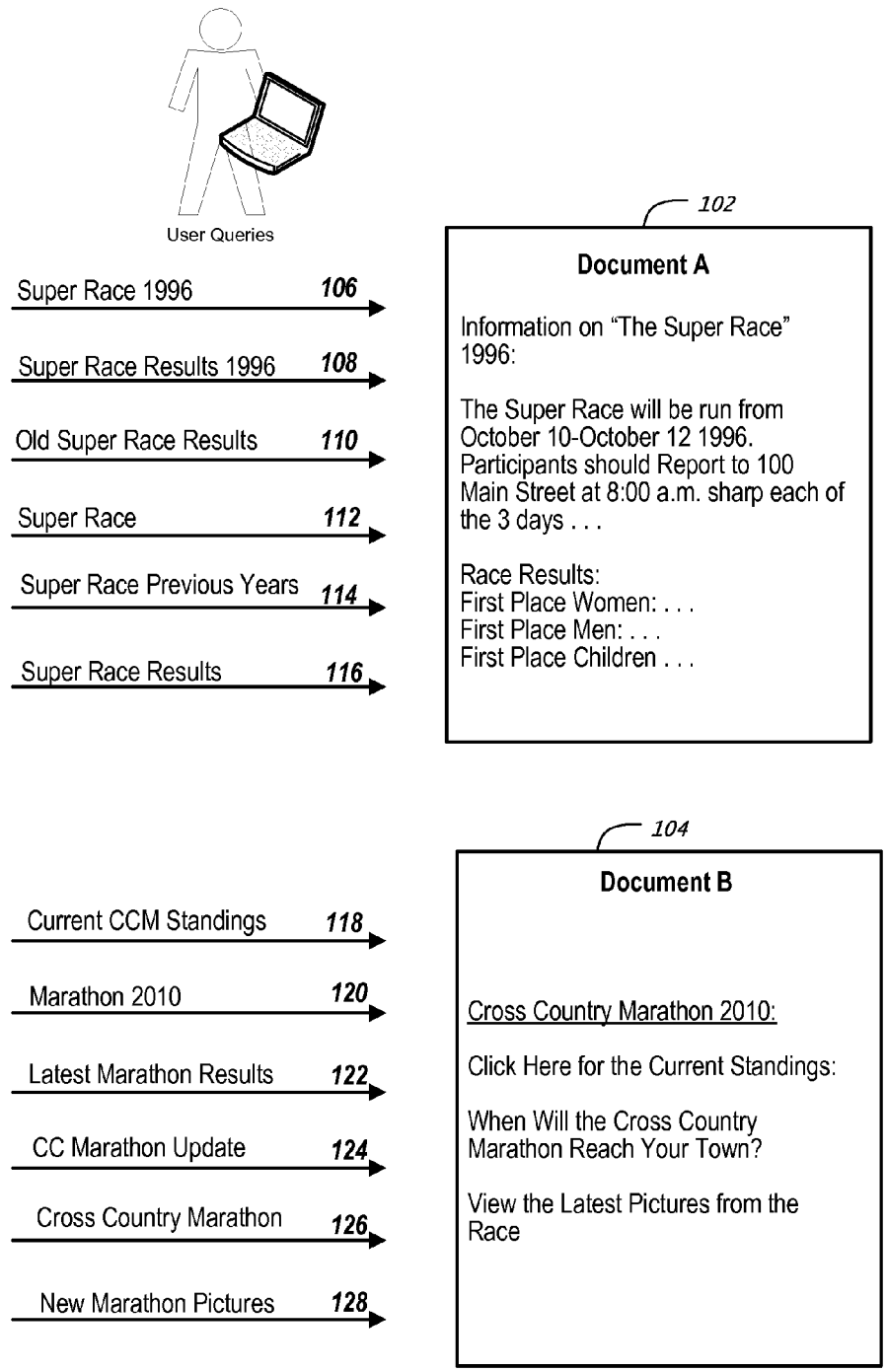
FIG. 1A illustrates an example of two documents and the queries associated with those documents.

FIG. 1 illustrates an example of two documents 102 and 104 and the queries associated with those documents. The example documents 102 and 104 are webpages. However, documents can be any type of electronic document, for example, images, multimedia content, or news articles on the Internet. An electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in a file.

Document A 102 includes information on "the Super Race" from 1996. This includes, for example, the dates of the race, where participants should report to start the race each day, and the results of the race. All of the information in document A 102 is about the 1996 race. The document does not have information about more recent versions of the race.

One way to determine that document A 102 contains old information is to examine queries associated with the document. A query is associated with the document if the user selected (e.g., clicked with a mouse or other input device including oral and tactile input devices) on a search result for the document presented in response to the query. For example, query 106 "Super Race 1996" is associated with document A 102. This means that at least one user submitted the query "Super Race 1996" and then selected a search result for document A 102 when the search result was presented for the query. In some implementations, a user must view the document a threshold amount of time before the query is associated with the document, e.g., the dwell time on the document must exceed a threshold. In some implementations, a document must have been selected a threshold number of times, or by a threshold number of users, to be considered associated with the document.

Each query associated with the document contains one or more terms. These terms can be used to determine whether the document contains old information, or more recent information. For example, terms that are old dates (e.g., "1996" when the year is 2010) or terms that denote old information (e.g., "old," "previous," "last year's," etc.) may indicate that the document contains old information. Similarly, terms that are new dates relative to the time at which the user is submitting the query (e.g., "2010" when the year is 2010) or terms that denote current information or information about something in the future (e.g., "new," "current" "future," "today," etc.) indicate that the document contains more recent information.

For example, several of the queries associated with document A 102 indicate that the document has old information. Query 106 "Super Race 1996" and query 108 "Super Race Results 1996" both include the date of the race "1996" which is years before the current date of 2010. Queries 110 "Old Super Race Results" and 114 "Super Race Previous Years" both indicate that the content of the document is old because of the words "Old" and "Previous." While some queries such as 112 "Super Race" and 116 "Super Race Results" do not indicate that the document is old, the majority of the queries associated with document A include terms that indicate that the document is old.

In contrast, document B 104 contains information on "Cross Country Marathon 2010." The document includes a link for the current standings in the race, updates on when the marathon will reach particular towns, and the latest pictures from the race. Assuming that we are considering this document in 2010, the document appears to be providing current information about an on-going race.

Much as the queries associated with document A 102 indicated that document A 102 contained old information, the queries associated with document B 104 indicate that document B 104 has recent information. For example, queries 118 "Current CCM Standings," 122 "Latest Marathon Results," 124 "CC Marathon Update," and 128 "New Marathon Pictures" include the words "Current" "Latest" "Update" and "New," each of which indicates that the person submitting the query was looking for recent information. Similarly, the query 120 "Marathon 2010" includes the current date 2010. While not all of the queries indicate that the document is new, for example, query 126 "Cross Country Marathon," the majority of the queries associated with document B do indicate that the document is new.

Users typically want search engines to provide the search results that are most relevant to a user's query. In general, unless queries explicitly suggest otherwise, a user is looking for the most recent information for the subject of their query. As will be described below, conventional search engines can be modified to use the queries associated with a document to determine an age classification of the document, and rank documents believed to have a new age classification higher than those documents might otherwise be ranked. In some implementations, the age of the document is determined based only on queries that match a user-submitted query. For example, if a user submitted the query "Super Race Results," the age of document A could be determined from the queries "Super Race Results 1996" 108, "Old Super Race Results" 110, and "Super Race Results" 116, but not consider the other queries associated with document A 102.

Figure 1B:
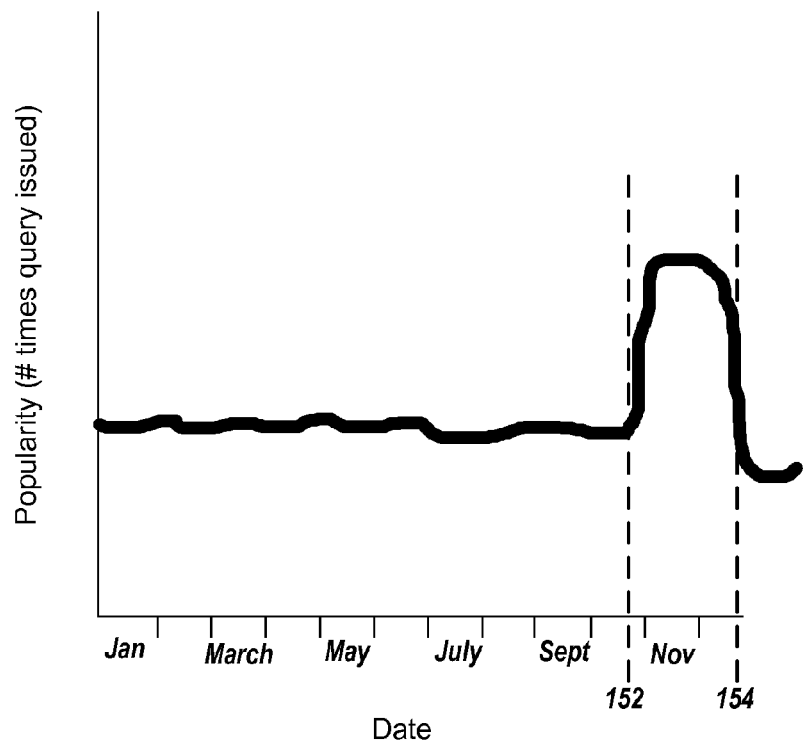
FIG. 1B illustrates query popularity over time for the query "how to cook a turkey."

FIG. 1B is a graph 150 that illustrates example changes in query popularity over time for the query "how to cook a turkey". Query popularity is another signal that a search engine can consider when determining whether to promote search results. Some queries have cyclic patterns in their popularity. For example, the query "Easter Bunny" may become more popular around Easter each year, as the Easter Bunny is strongly associated with Easter.

As shown in FIG. 1B, the popularity of the query "how to cook a turkey" remains relatively constant until time 152, just before November. The query popularity then increases dramatically and stays at the higher peak until time 154, just after the beginning of December, when the query has a decrease in popularity and returns to its previous level of popularity. This temporary increase in popularity can be caused, for example, by search engine users in the United States who are interested in learning how to cook a turkey for the Thanksgiving holiday.

A search engine can consider this temporal signal, for example, to temporarily increase the ranking of search results during a particular time window, when those search results are associated with queries that usually have an increase in popularity during that particular time window, or when the search results include terms in queries that usually have an increase in popularity during that particular time window.

Users may also select different search results in response to a query at different times of the year. For example, users might normally select search results describing the country Turkey after submitting a search query "Turkey," but might select search results on how to cook a turkey during November, because users are interested in cooking turkey for Thanksgiving dinner. The search results selected at different times of the year can also be used as a temporal signal.

While FIG. 1B illustrates a temporary increase in query popularity, the temporal data could also indicate a decrease in query popularity, in which case, search results could have their rankings decreased during the time window when their related queries have a decrease in popularity.

Figure 2:
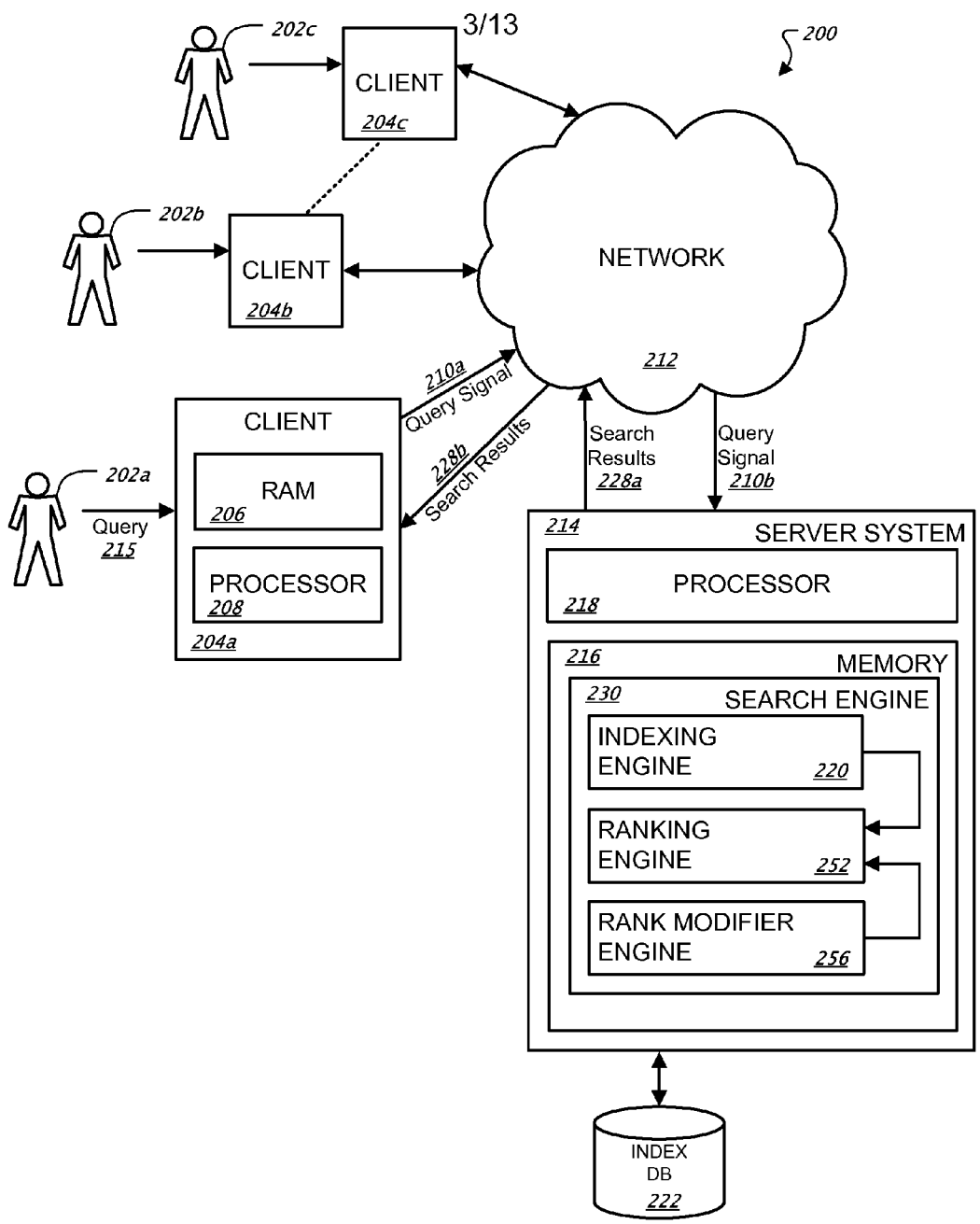
FIG. 2 illustrates an example search system.

FIG. 2 illustrates an example search system 200 for identifying search results in response to search queries as can be implemented in an internet, intranet, or other client/server environment. The system 200 is an example of an information retrieval system in which the systems, components and techniques described below can be implemented. Although several components are illustrated, there may be fewer or more components in the system 200. Moreover, the components can be distributed on one or more computing devices connected by one or more networks or other suitable communication mediums.

A user 202 (202*a*, 202*b*, 202*c*) interacts with the system 200 through a client device 204 (204*a*, 204*b*, 204*c*) or other device. For example, the client device 204 can be a computer terminal within a local area network (LAN) or wide area network (WAN). The client device 204 generally includes a random access memory (RAM) 206 (or other memory and/or a storage device) and a processor 208. The processor 208 is structured to process instructions within the system 200. In some implementations, the processor 208 is a single-threaded processor. In other implementations, the processor 208 is a multi-threaded processor. The processor 208 can include multiple processing cores and is structured to process instructions stored in the RAM 206 (or other memory and/or a storage device included with the client device 204) to display graphical information for a user interface.

A user 202*a* connects to the search engine 230 within a server system 214 to submit a query 215. When the user 202*a* submits the query 215 through an input device attached to a client device 204*a*, a client-side query signal 210*a* is sent into a network 212 and is forwarded to the server system 214 as a server-side query signal 210*b*. Server system 214 can be one or more server devices in one or more locations. A server device 214 includes a memory device 216, which can include the search engine 230 loaded therein. A processor 218 is structured to process instructions within the device 214. These instructions can implement one or more components of the search engine 230. The processor 218 can be a single-threaded processor or a multi-threaded processor, and can include multiple processing cores. The processor 218 can process instructions stored in the memory 216 related to the search engine 230 and can send information to the client device 204, through the network 212, to create a graphical presentation in a user interface of the client device 204 (e.g., a search results web page displayed in a web browser).

The server-side query signal 210b is received by the search engine 230. The search engine 230 uses the information within the user query 215 (e.g. query terms) to find relevant documents. The search engine 230 can include an indexing engine 220 that actively searches a corpus (e.g., web pages on the Internet) to index the documents found in that corpus, and the index information for the documents in the corpus can be stored in an index database 222. This index database 222 can be accessed to identify documents related to the user query 215.

The search engine 230 includes a ranking engine 252 to rank the documents related to the user query 215. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 252 receives one or more additional signals from a rank modifier engine 256 to assist in determining an appropriate ranking for the documents. The rank modifier engine 256 provides one or more measures of relevance for the documents, which can be used by the ranking engine 252 to improve the search results' ranking provided to the user 202.

The search engine 230 forwards the final, ranked result list within a server-side search results signal 228a through the network 212. Exiting the network 212, a client-side search results signal 228b is received by the client device 204a where the results are stored within the RAM 206 and/or used by the processor 208 to display the results on an output device for the user 202a.

The server system 214 may also maintain one or more user search histories based on the queries it receives from a user and which results a user selected after a search was performed.

Figure 3A:
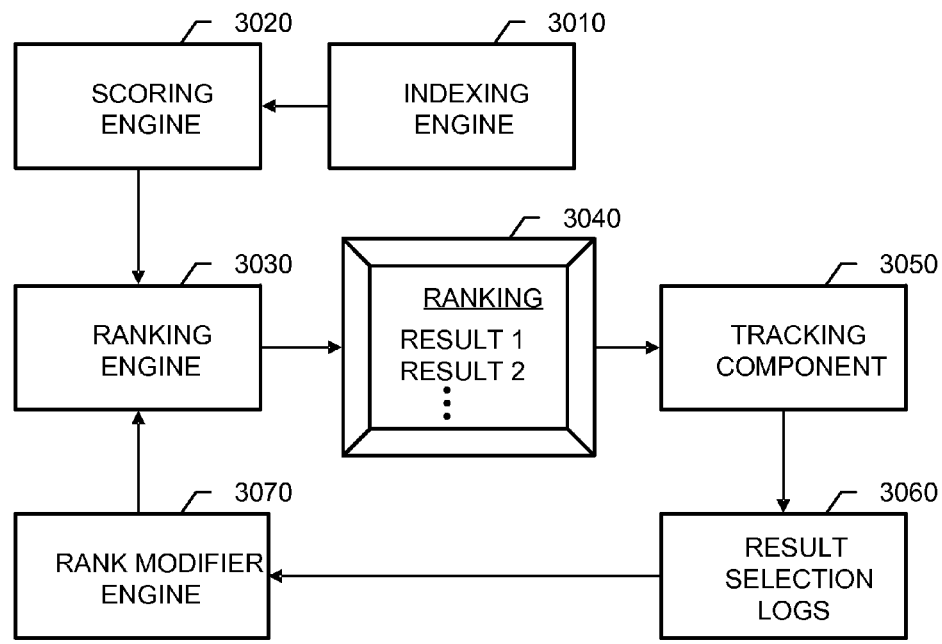
FIG. 3A illustrates example components of an information retrieval system.

FIG. 3A illustrates example components of an information retrieval system. These components include an indexing engine 3010, a scoring engine 3020, a ranking engine 3030, and a rank modifier engine 3070. The indexing engine 3010 functions as described above for the indexing engine 220. The scoring engine 3020 generates scores for document results based on many different features, including content-based features that link a query to document results, and query-independent features that generally indicate the quality of document results. The content-based features include, for example, aspects of document format, such as query matches to title or anchor text in an HTML (Hyper Text Markup Language) page. The query-independent features include, for example, aspects of document cross-referencing of the document or the domain. Moreover, the particular functions used by the scoring engine 3020 can be tuned, to adjust the various feature contributions to the final IR score, using automatic or semi-automatic processes.

The ranking engine 3030 produces a ranking of document results 3040 for display to a user based on IR scores received from the scoring engine 3020 and one or more signals from the rank modifier engine 3070. The rank modifier engine 3070 provides one or more measures of relevance for the documents, which can be used by the ranking engine 3030 to improve the search results' ranking provided to the user. A tracking component 3050 is used to record information regarding user behavior such as individual user selections of the results presented in the ranking 3040. In some implementations, the tracking component 3050 is embedded JavaScript code included in a web page ranking 3040 that identifies user selections of individual document results and also identifies when the user returns to the results page, thus indicating the amount of time the user spent viewing the selected document result. In other implementations, the tracking component 3050 is a proxy system through which user selections of the document results are routed. The tracking component can also include pre-installed software at the client. Other implementations are also possible, for example, an implementation that uses a feature of a web browser that allows a tag/directive to be included in a page, which requests the browser to connect back to the server with message(s) regarding link(s) clicked by the user.

The recorded information is stored in result selection logs 3060. In various implementations, the recorded information includes log entries that indicate user interaction with each result document presented for each query submitted. For each user selection of a result document presented for a query, the log entries indicate the query (Q), the document (D), the user's dwell time (T) on the document, the language (L) employed by the user, and the country (C) where the user is likely located (e.g., based on the server used to access the IR system) and a region code (R) identifying the metropolitan area of the user. The log entries can also record information about document impressions. An impression is recorded each time a result document is presented in a results list for the query. Other standards for recording impressions can also be used. For example, an impression can be recorded when a user selects the document, or a document below the document in the result list. An impression can also be recorded when a user selects the document directly above the document in the result list. In some implementations, a weighted count of impressions is calculated for each document presented in response to the query. For example, if a user selects the document or a document below the document in the result list, 1 is added to the weighted count. If a user selects a document above the document, a value of less than 1 is added to the weighted count. The value can be a constant or can be determined, for example, by dividing 1 by the number of documents between the document and the selected document in the search result list.

The log entries can also record negative information, such as the fact that a document result was presented to a user, but was not selected. Other information such as position(s) of click(s) (i.e., user selection(s)) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main page and clicking on another document result (or submitting a new search query) is also recorded. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

Aggregated click data from queries for a given document can be used to generate a quality of result statistic for the document as a search result for the query. In general, the quality of result statistic estimates how responsive users found a given document to be as a search result for a given query. The quality of result statistic can be used to rank or enhance a ranking of the document.

Various heuristics for calculating the quality of result statistic can be used. For example, a quality of result statistic can be an average of the weighted long clicks for a given document and query pair, a sum of the weighted clicks for a given document and query pair, or a click fraction for a given document and query pair. Various weights are also possible, for example, the clicks can be weighted by the length of the clicks, by how quickly a user clicked on a result, and whether a user clicked on a result first, second, third, etc. Various types of click fractions are possible. For example, in some implementations, the click fraction is calculated by dividing the number of clicks (or the number of weighted clicks) by the number of impressions. In other implementations, the click fraction is calculated by dividing the sum of the weighted clicks by the total number of clicks. In still other implementations, the click fraction is the sum of weighted clicks for the document presented in response to the query divided by sum of weighted clicks for all documents presented in response to the query. Other click fractions are also possible.

The components shown in FIG. 3A can be combined in various manners and implemented in various system configurations. For example, the scoring engine 3020 and the ranking engine 3030 can be merged into a single ranking engine, such as the ranking engine 252 of FIG. 2. The rank modifier engine 3070 and the ranking engine 3030 can also be merged, and in general, the ranking engine 3030 can include any software component that generates a ranking of document results after a query. Moreover, the ranking engine 3030 can be included in a client system in addition to (or rather than) in a server system.

Figure 3B:
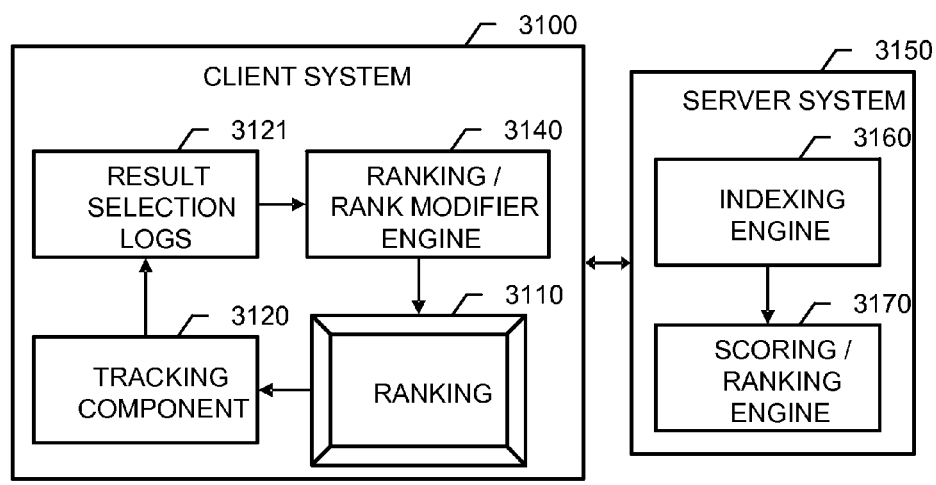
FIG. 3B illustrates another example information retrieval system.

FIG. 3B illustrates another example information retrieval system. In this system, a server system 3150 includes an indexing engine 3160 and a scoring/ranking engine 3170. A client system 3100 includes a user interface 3110 for presenting a ranking, a tracking component 3120, result selection logs 3121 and a ranking/rank modifier engine 3140. For example, the client system 3100 can include a company's enterprise network and personal computers, in which a browser plug-in incorporates the ranking/rank modifier engine 3140. When an employee in the company initiates a search on the server system 3150, the scoring/ranking engine 3170 can return the search results along with either an initial ranking or the actual IR scores for the results. The browser plug-in then re-ranks the results locally based on tracked page selections for the company-specific user base.

Figure 4:
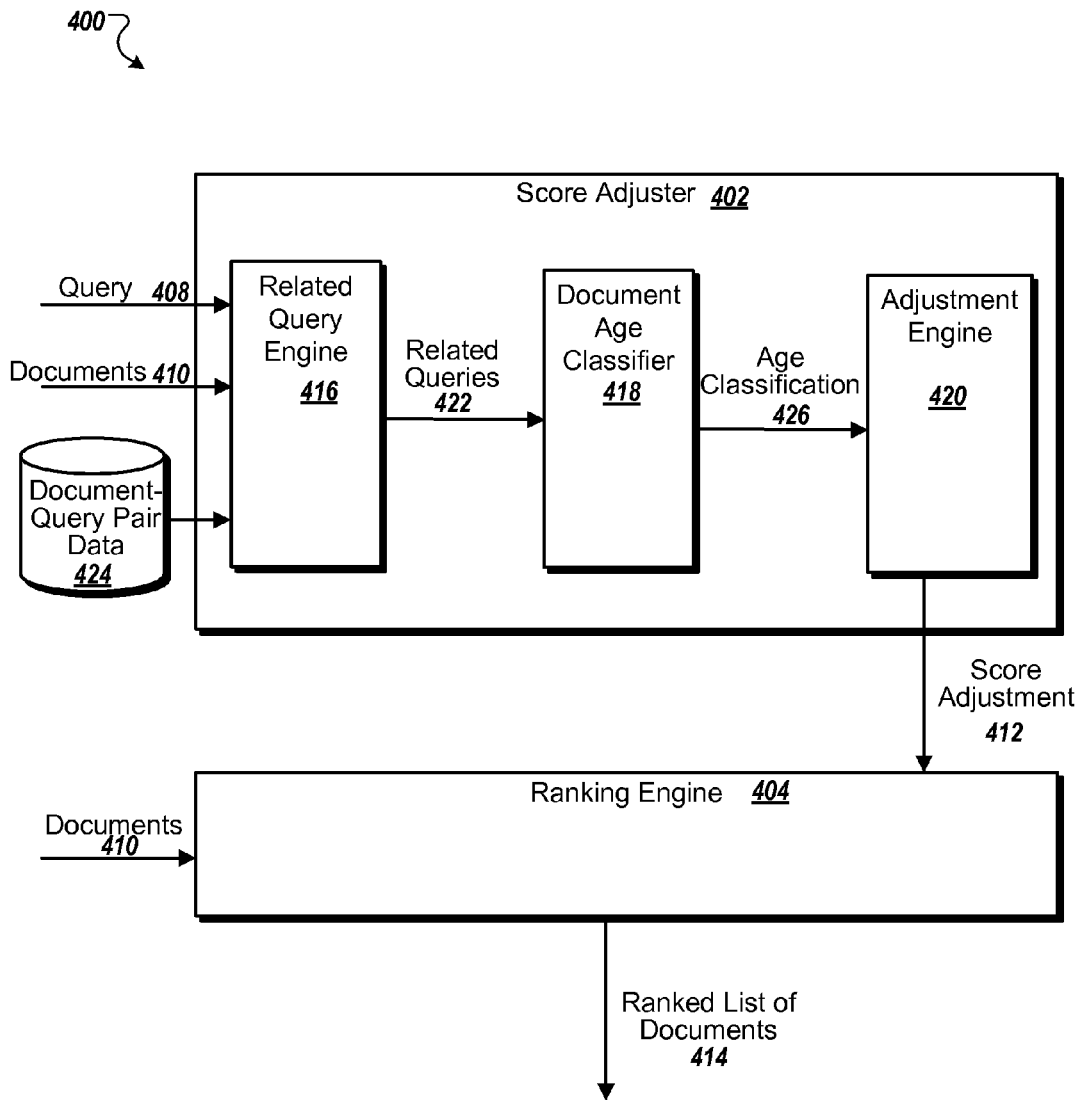
FIG. 4 illustrates an example system including a score adjuster that provides score adjustment information to a ranking engine.

FIG. 4 illustrates an example system 400 including a score adjuster 402 that provides score adjustment information to a ranking engine 404. The score adjuster 402 is an example component of the rank modifier engine 256 described above with reference to FIG. 2.

The score adjuster 402 receives, for a given query 408, documents 410 responsive to the query. The score adjuster 402 then processes these documents 410 and determines an appropriate score adjustment 412 for one or more of the documents. The ranking engine 404 also receives the documents 410, as well as the score adjustments 412 for one or more of the documents, and generates a ranked list of the documents 414, according to scores for the documents and the score adjustments.

The score adjuster 402 includes a related query engine 416, a document age classifier 418, and an adjustment engine 420. However, other combinations of components that provide the same, or similar, functionality, can alternatively be used.

The related query engine 416 identifies related queries 422 associated with each of the documents in the received document-score pairs. To identify these related queries, the related query engine 416 analyzes document-query pair data 424 that stores pairs of documents and queries. Each pair includes a document and a related query of the document. The document-query pair data can be derived from log information generated by a search engine, for example, as described above with reference to FIG. 3A.

In some implementations, the document-query pair data further includes one or more quality of result statistics for the document and the query, and the related query engine 516 only identifies related queries for which the document has a quality of result statistic that satisfies a threshold.

In some implementations, the related query engine 416 identifies all queries in a document-query pair for the document being processed as being related queries. In other implementations, the related query engine 416 identifies a subset of the queries as being related queries. The subset can be, for example, queries that match the received query 408. A related query matches the received query 408 when it includes one or more terms that are identical to or substantially identical to one or more of the terms in the received query. Two terms are identical when they are the same term, for example, the term "reading" is identical to the term "reading." Two terms are substantially identical when they have the same stem form, when they differ in small ways such as slight differences in spelling, or when they are synonyms for each other. For example, the term "reading" is substantially identical to the term "reads," since both have the same stem form "read." The term "color" is substantially identical to the term "colour," since the two terms differ only in small differences in spelling. The term "bike" is substantially identical to the term "bicycle," since the two terms are synonyms. Other standards for determining when terms are substantially identical can also be used.

In some implementations, all terms in the received query must be identical or substantially identical to a term in the related query before the two queries are matched. In some implementations, in order for the queries to be matched, the only terms in the related query that are not substantially identical to a term in the received query 408 must be temporal terms. Temporal terms are described in more detail below.

The document age classifier 418 receives the related queries 422 for each document being processed. The document age classifier 418 then classifies the age of the document from the terms in the related queries.

In some implementations, the document age classifier 418 determines an age classification 426 for each of the related queries from the terms in the queries, and then determines an age classification for the document from the age classification for the related queries of the document.

The document age classifier 418 determines an age classification for a query according to one or more terms of the query. In some implementations, the document age classifier 418 classifies each related query as one of: new, old, or non-temporal. A new query is a query that includes one or more new temporal terms, an old query is a query that includes one or more old temporal terms, and all other queries are non-temporal queries. If a query contains both new and old temporal terms, the query can be classified as an old query in some implementations, as a new query in other implementations, and as a non-temporal query in still other implementations. A temporal term is a term that conveys information about the time reference of the query; e.g., is the query asking about new information or old information. The document age classifier 418 can determine whether a given term is a new temporal term or an old temporal term, for example, by comparing the term to a list of new temporal terms and a list of old temporal terms. Each list can include dates and terms that connote the appropriate temporal meaning, for example, as described above with reference to FIG. 1. In some implementations, the document age classifier 418 only considers temporal terms that were not included in the received query 408. For example, if the received query 408 was "new marathon results," and one of the related queries included the temporal term "new," the term "new" would not be considered for the purpose of classifying the related query.

Once each related query is classified, the document age classifier 418 classifiers the document according to the age classifications of the related queries of the document. For example, the document age classifier 418 can generate a new count and/or an old count for the related queries for the document. If the new count satisfies, e.g., exceeds, a first threshold, the document age classifier 418 classifies the document as a new document. In some implementations, the new count divided by the total number of queries associated with the document must also satisfy another threshold, e.g., exceed the other threshold, for the document to be classified as a new document. In some implementations, the old count must also satisfy a second threshold, e.g., be below the second threshold, for the document to be classified as a new document. If the old count satisfies a second threshold, the document age classifier 418 classifies the document as an old document. In some implementations, the old count divided by the total number of queries associated with the document must also satisfy a third threshold, e.g., exceed the third threshold, for the document to be classified as an old document. In some implementations, the new count must also satisfy a fourth threshold, e.g., be below the fourth threshold, for the document to be classified as a new document. If the document is not classified as an old document or a new document, the document age classifier 418 classifies the document as a non-temporal document.

In some implementations, the new count is the number of related queries that were classified as new queries, and the old count is the number of related queries that were classified as old queries. In other implementations, the new count is a weighted count where each new query and/or each old query is weighted by a quality of result statistic for the document and the related query, or a factor derived from a quality of result statistic for the document and the related query. For example, each query can be weighted by the number of long clicks for the query and the document divided by the total number of long clicks for the query and the document. Other quality of result statistics can also be used. Example quality of result statistics are described in more detail above, with reference to FIG. 3A.

While the above describes classifying a document as old, new, or non-temporal, other classification structures can be used. For example, in some implementations documents are classified as old or not-old; in some implementations, documents are classified as new or not-new; and in some implementations, documents are classified according to a more finely grained classification system.

If the document is classified as a non-temporal document, the score adjuster 402 does not determine an adjusted score for the document. If the document is classified as an old or a new document, the score adjuster 402 sends the age classification 426 to the adjustment engine 420.

The adjustment engine 420 determines an appropriate score adjustment 412 for the document, and sends the score adjustment 412 to the ranking engine 404. In some implementations, the adjustment engine determines a score adjustment that increases the score by a first predetermined factor when the document is a new document and decreases the score by a second predetermined factor when the document is an old document. The first and second predetermined factors can be the same or different factors and can be determined, for example, empirically. Each factor can be, for example, a fixed amount that is added or subtracted from the score, or a fixed amount that is multiplied by the score, to generate the adjusted score.

In some implementations, the adjustment engine 420 determines the value of the factor from the new count or the old count generated by the document age classifier 418. For example, if the document is classified as a new document, the adjustment engine 420 can derive an appropriate adjustment factor from the new count of new queries related to the document. Similarly, if the document is classified as an old document, the adjustment engine 420 can derive an appropriate adjustment factor from the old count of old queries related to the document.

In some implementations, the adjustment engine 420 selects the factor used to adjust the score for a document relative to the score for other documents. For example, the adjustment engine can select the factors so that each new document is scored higher than each old document, but a given new document is not scored higher than another new document that initially had a higher score than the given new document.

The ranking engine 404 receives the document-score pairs 410 and the document-adjusted score pairs 412 for the documents, and then ranks the documents according to the scores and the score adjustments. The ranking engine 404 applies the score adjustments to the appropriate document scores to determine adjusted scores for the documents, and ranks each document according to the adjusted score for the document if the document has an adjusted score, and otherwise according to the unadjusted score for the document.

Figure 5:
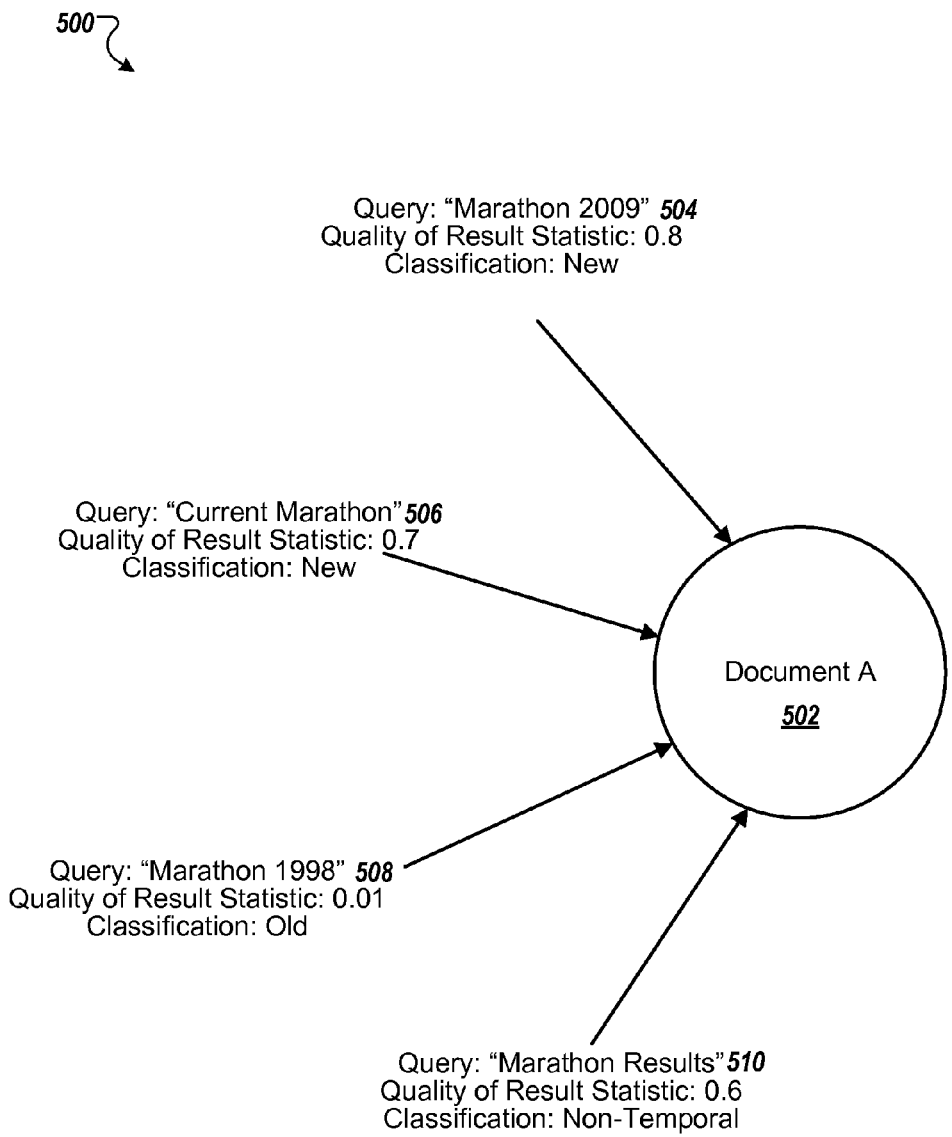
FIG. 5 illustrates an example document and example age-classified related queries for the document.

FIG. 5 illustrates an example document and example age-classified related queries for the document. Document A 502 has four associated queries: "Marathon 2010" 604, "Current Marathon" 506, "Marathon 1998" 508, and "Marathon Results" 510. Two of the queries are classified as new queries ("Marathon 2010" and "Current Marathon"), one of the queries is classified as an old query ("Marathon 1998"), and one of the queries is classified as non-temporal ("Marathon Results").

A document age classifier can classify the age of document A 502 based on the classifications of the related queries. For example, if the document age classifier uses an unweighted count, the new count for document A 502 is two, because two related queries are classified as new. The old count for document A 502 is one, because only one related query is classified as old. As another example, if the document age classifier weights the count by a quality of result statistic for each query, the new count is 0.8+0.7=1.5, because new query 504 has a quality of result statistic of 0.8, and new query 506 has a quality of result statistic of 0.7. Therefore, the weighted count is generated by summing the quality of result statistics for the two queries. Similarly, the old count is 0.01, because the query 508 has a quality of result statistic of 0.01.

The document age classifier can then determine the appropriate classification for document A 502 based on the old and new counts. For example, if the threshold for the new count is 1.4, then document A 502 will be classified as new, because its new count exceeds the threshold.

Figure 6:
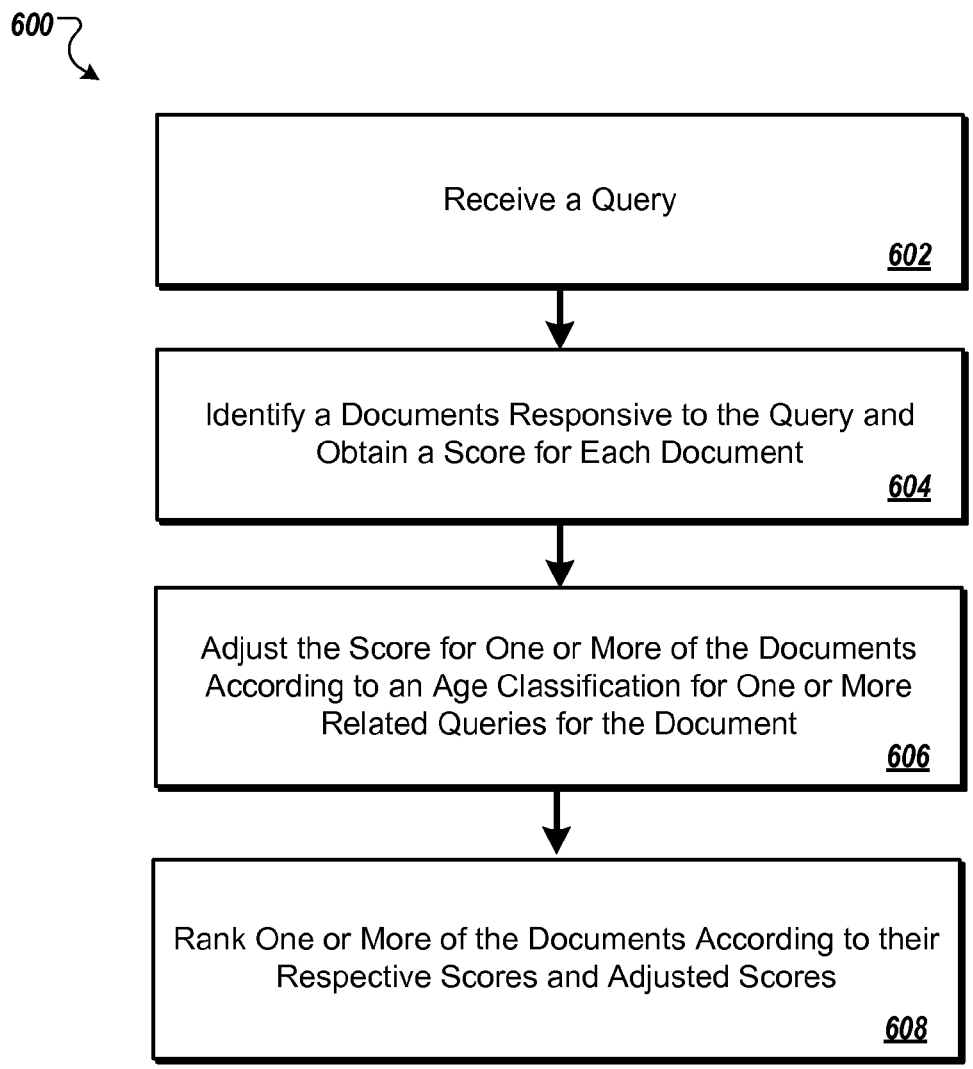
FIG. 6 illustrates an example technique for ranking documents according to adjusted scores determined from an age classification for related queries for the documents.

FIG. 6 illustrates an example technique 600 for ranking documents according to adjusted scores determined from an age classification for related queries for the documents. For convenience, the example technique 600 will be described in reference to a system that performs the technique 600. The system can be, for example, the system 400.

The system receives a query (602), for example, as described above with reference to FIG. 2. The system identifies documents responsive to the query and obtains a score for each document (604), for example using conventional scoring techniques.

The system adjusts the score for one or more of the documents according to an age classification for one or more of the related queries for the document (606), for example, as described above with reference to FIG. 4. In some implementations, the system further determines that the received query is not an old query before determining the adjusted score. For example, the system can classify the received query as described above with reference to FIG. 4. If the query is an old query, then the user may not be particularly interested in more recent documents, and therefore no score adjustment is needed.

The system ranks one or more of the documents according to their respective scores and adjusted scores (608). For example, the system can use the adjusted score for a document if the document has an adjusted score, and otherwise can use the score for the document, as described above with reference to FIG. 4.

In some implementations, the system then presents the responsive documents according to the determined rank. For example, the system can send the ranked list of search results corresponding to the documents to a user device for presentation to the user.

Figure 7:
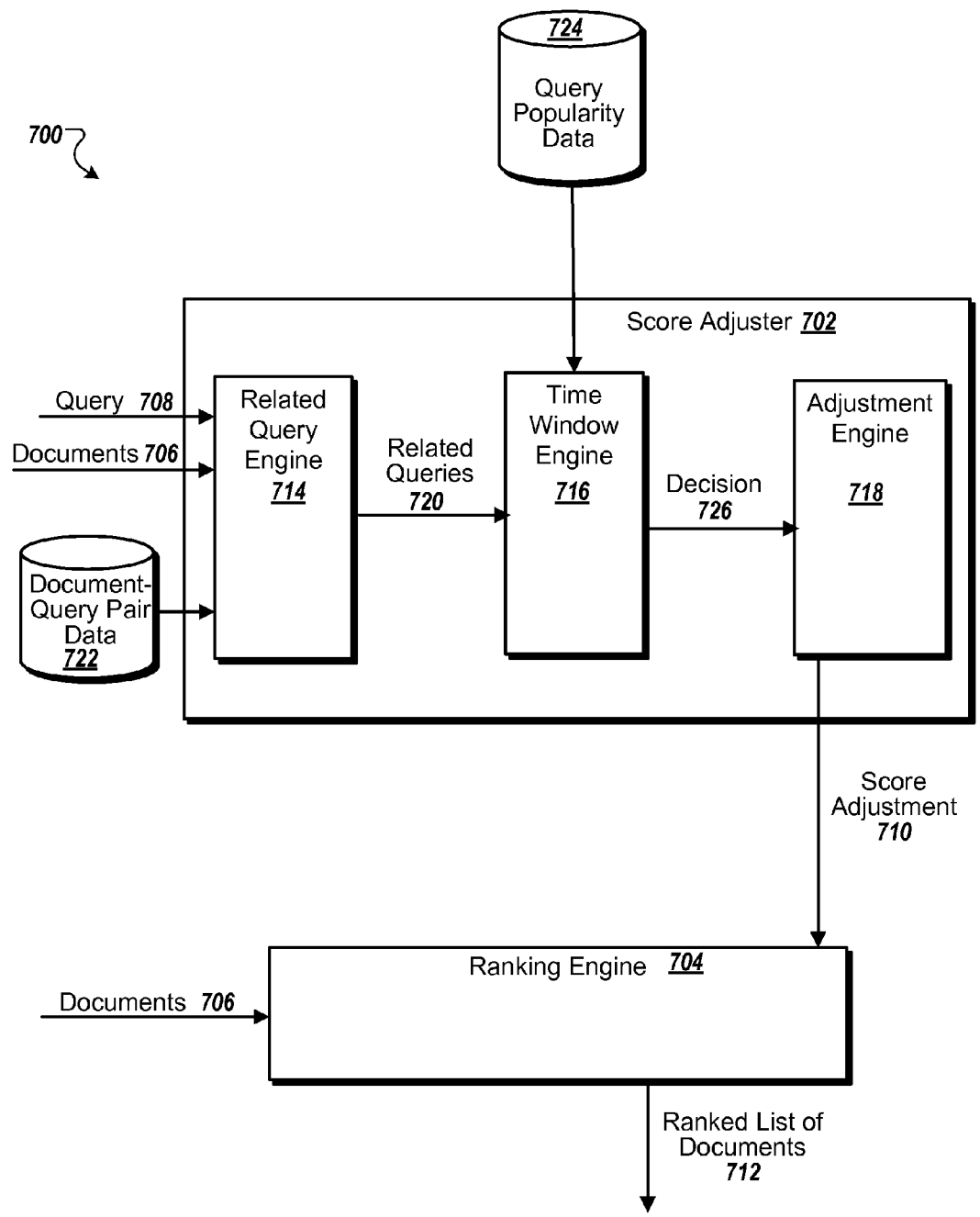
FIG. 7 illustrates an example system including another score adjuster that provides score adjustment information to a ranking engine.

FIG. 7 illustrates an example system 700 including a score adjuster 702 that provides score adjustment information to a ranking engine 704. The score adjuster 702 is an example component of the rank modifier engine 256 described above with reference to FIG. 2, and can be used instead of or in addition to the score adjuster 402 described above with reference to FIG. 4. The score adjuster 702 determines score adjustments for documents responsive to a submitted query according to whether related queries for the document have a change in popularity during the time the submitted query is submitted.

The score adjuster 702 receives documents 706 responsive to a submitted query 708. The score adjuster 702 processes the documents 706 to determine an appropriate score adjustment 710 for one or more of the documents.

The ranking engine 704 receives the documents 706 and score adjustments 710, and generates a ranked list of the documents 712, according to scores for the documents and the score adjustments.

The score adjuster 702 includes a related query engine 714, a time window engine 716, and a score adjustment engine 718.

The related query engine 714 identifies related queries 720 associated with each of the documents in the received document-score pairs. To identify these related queries, the related query engine 714 analyzes document-query pair data 722, for example, as described above with reference to FIG. 4. In some implementations, the related query engine 714 identifies all queries in a document-query pair with the document as being related queries. In other implementations, the related query engine 714 identifies a subset of matching queries as the related queries, for example, as described above with reference to FIG. 4. The time window engine 716 receives the related queries 720 for each document.

The time window engine 716 identifies a popularity time change window for one or more of the related queries from query popularity data 724. The query popularity data 706 is historical data on the number of submissions of queries over time. For example, the query popularity data 706 can be time series data indicating number of submissions of the query over time. Alternatively, the query popularity data 706 can be query log data indicating what queries users submitted at particular times. The query log data is preferably anonymized to protect user privacy. The query popularity data 706 can correspond to historical data from a past few months, a past few years, or an even longer period of time.

The popularity of a related query is derived from the number of times users submit the related query to a search engine. In some implementations, the popularity is the total number of times user submit the related query to a search engine. In other implementations, the popularity is the number of times users submit the related query to a search engine after submitting the query 708 (e.g., as determined from query log data).

The time window engine 716 processes the received data for the related queries to determine one or more popularity time change windows for the related queries. A popularity change time window is a re-occurring period of time during which a popularity of a query temporarily changes beyond a threshold amount. The threshold can be determined empirically, for example, so that small background fluctuations in popularity are not identified as popularity time change windows.

For example, a popularity change time window can correspond to a temporary spike, or a temporary dip in query popularity. In general, the popularity of a query returns to its pre-popularity change time window level at the end of the popularity change time window. For example, in FIG. 1B, the popularity change time window would be the time between time 152 and 154. During that time, the popularity of the query spiked, i.e., temporarily increased from its baseline level before the start of the time change window.

The time window engine 716 can determine the popularity time change windows for a query from an analysis of the query popularity data 804. For example, the time window engine 716 can analyze the time trend data to identify statistically significant spikes or dips in submissions for a given query. The time during which there is a statistically significant spike or dip in submissions for the query is a popularity time change window. The system can determine statistically significant spikes or dips, for example, using conventional time series analysis techniques.

The time window engine 716 can also determine whether the popularity time change window corresponds to primarily an increase in or a decrease in popularity. The increase/decrease is measured relative to a baseline level of popularity for the query before the popularity time change window.

In some implementations, query popularity data 704 from multiple periods is considered by the time window engine 716 when generating the popularity time change window data. For example, the time window engine 716 can consider data from each of several past calendar years. In some implementations, the time window engine 716 aggregates the data over the multiple periods and identifies statistically significant spikes and dips in the aggregate data. For example, the time window engine 716 could aggregate the data for a query for each day of the calendar year (January 1, January 2, January 3, etc.) across multiple years, and then determine spikes and dips in the aggregate data. In other implementations, the time window engine 716 does not aggregate the data over multiple periods, but instead determines popularity time change windows for each period, and then generates an aggregate popularity time change window, for example, during the times that the period-specific time change windows overlap.

The time window engine 716 determines whether the time the submitted query 708 was submitted is within the time change window for one or more of the related queries, for example, by comparing the time that the submitted query 708 was submitted to the time change window data 724. The time the submitted query was submitted is within a time change window if the time of submission corresponds to the time change window. For example, if the time change window corresponds to the month of January and is based on data from January 2000 to January 2009, and the query is submitted on Jan. 2, 2010, the time the query is submitted corresponds to the time change window because it falls within the time change window. Similarly, if the time change window is the first two weeks of every month, and the query is submitted on the first day of a month, the time the query is submitted corresponds to the time change window.

If the query 708 was not submitted during the time change window for one of the related queries, the score adjuster 702 does not determine a score adjustment. Otherwise, the score adjuster 702 provides the details of the decision 726 made by the time window engine 716 to the adjustment engine 718 to determine an appropriate score adjustment.

The adjustment engine 718 determines an appropriate score adjustment 710 for one or more of the documents and sends the score adjustment 710 to the ranking engine 704.

In some implementations the adjustment engine 718 adjusts the scores according to whether the popularity time change window during which the query 708 was submitted corresponds to an increase in popularity, e.g., a popularity spike, or a decrease in popularity, e.g., a popularity dip.

For example, in some implementations, the adjustment engine 718 increases the score by a first predetermined factor when the popularity time change window corresponds to an increase in popularity, and decreases the score by a second predetermined factor when the popularity time change window corresponds to a decrease in popularity. The first and second predetermined factors can be the same or different factors and can be determined, for example, empirically. Each factor can be, for example, a fixed amount that is added or subtracted from the score, or a fixed amount that is multiplied by the score, to generate the adjusted score.

As another example, in other implementations, the adjustment engine 718 determines the value of the factor from other data about the popularity time change window. For example, the factor can have greater magnitude when the popularity time change window is of a shorter length. As another example, the factor can have greater magnitude when the spike or dip in popularity (e.g., the overall change in popularity numbers) has a greater magnitude.

In some implementations, the adjustment engine 718 determines the value of the factor from the number of relevant popularity time change windows during which the query 708 was submitted. A relevant popularity time change window is a popularity time change window for one of the related queries for the document being scored.

For example, the factor can have a magnitude derived from the number of relevant popularity time change windows during which the query 708 was submitted. The larger the number of popularity time change windows, the larger the factor. In some implementations, the adjustment engine 718 can sum, average, or otherwise combine a score for each query with a relevant popularity time change window during which the query 708 was submitted. The score for each popularity window can be derived from the magnitude of the change in popularity during the popularity time change window or can be derived from the length of the time change window. For example, the score can have a greater magnitude when the change is greater and a greater magnitude when the length is smaller. The direction of the score, e.g., positive or negative, can be derived from whether the popularity increased or decreased during the time window.

As another example, the factor can have a magnitude derived from the relative popularity of the relevant queries with popularity time change windows during which the query 708 was submitted. For example, if query popularity is measured by number of times queries are submitted, the score for a relevant query r, for user-submitted query u during time period t can be calculated according to the following formula:

score($r$)=number of times query $r$ is submitted during time period $t$/number of times query $u$ is submitted during time period $t$ As another example, if query popularity is measured by the number of times users refine their queries from the submitted query to a relevant query, the score for a relevant query r, for a user-submitted query u during time period t can be calculated according to the following formula:

score($r$)=number of times query refinement $r$ is submitted during time period $t$/number of times query $u$ is submitted during time period $t$ A particular query is submitted as a query refinement of another query if a user first submits the other query and then submits the particular query after the other query. In some implementations, the particular query must include one or more terms of the other query to be considered a refinement. For example, "Olympics 2010" is a refinement of "Olympics," but "Winter competition 2010" is not a refinement of "Olympics." In some implementations, the particular query must follow the other query within a threshold number of queries or a threshold amount of time of the other query. For example, if a user submitted the query "Olympics" and then submitted the query "Olympics 2010" five seconds later, the query "Olympics 2010" could be identified as a refinement for the query "Olympics." In some implementations, the user must not select any search results responsive to the other query before submitting the particular query in order for the particular query to be considered a query refinement.

The ranking engine 704 receives the document-score pairs 706 and the score adjustments 710 for the documents, and ranks the documents according to the scores and score adjustments. The ranking engine 704 generates adjusted scores for documents having score adjustments, and then ranks each document according to the adjusted score for the document if the document has an adjusted score, and otherwise according to the unadjusted score for the document.

Figure 8:
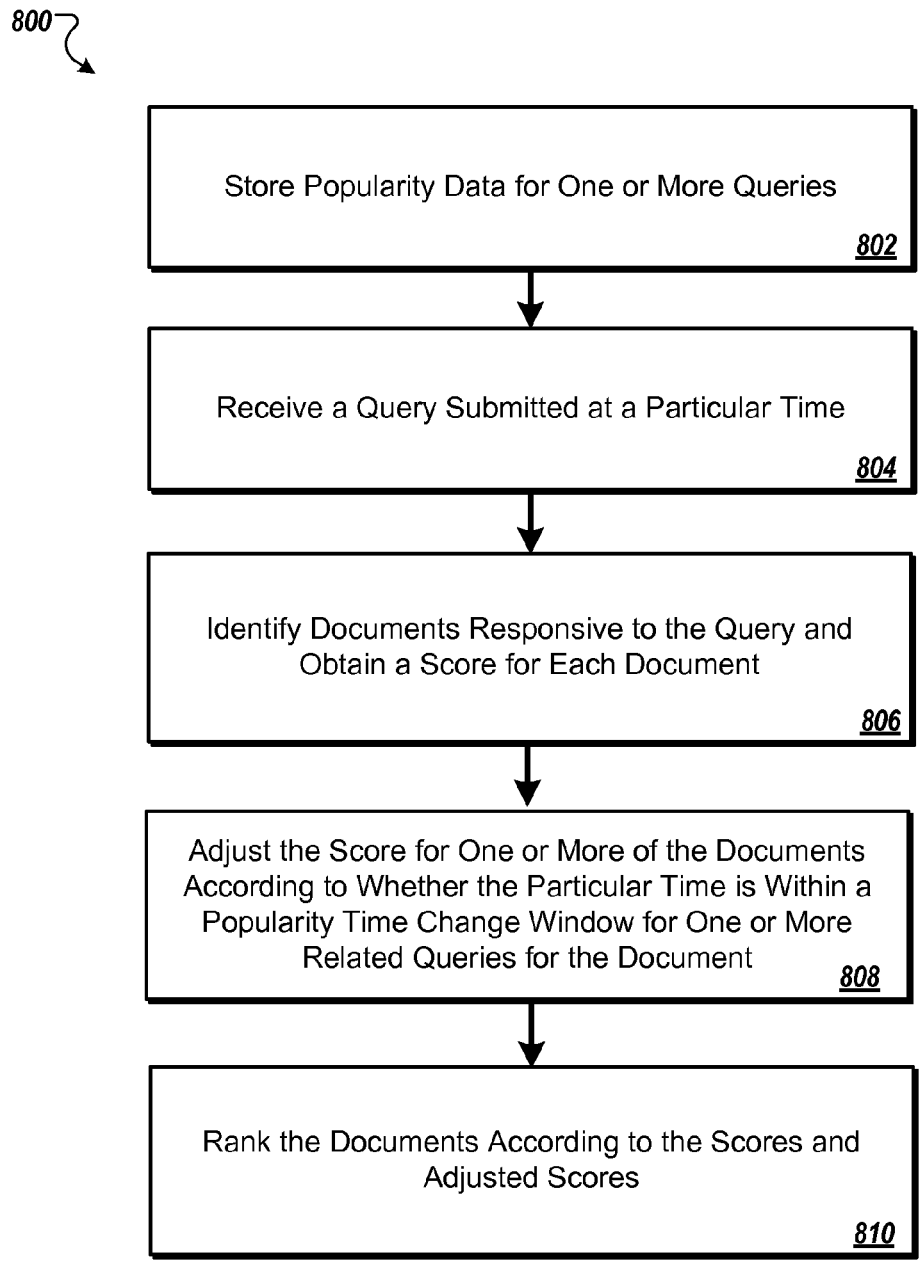
FIG. 8 illustrates an example technique for ranking documents responsive to a user-submitted query according to whether queries associated with the documents have a popularity time change window that overlaps with the time that the user-submitted query was submitted.

FIG. 8 illustrates an example technique 800 for ranking documents responsive to a user-submitted query according to whether queries associated with the documents have a popularity time change window that overlaps with the time that the user-submitted query was submitted. For convenience, the example technique 800 will be described in reference to a system that performs the technique 800. The system can be, for example, the system 700.

The system stores popularity data for one or more queries (802), for example, as described above with reference to FIG. 7.

The system receives a query submitted at a particular time (804), for example, as described above with reference to FIG. 2. The system identifies documents responsive to the query and obtains a score for each document (806), for example, as described above with reference to FIG. 2.

The system adjusts the score for one or more of the plurality of documents according to whether the particular time is within a popularity time change window for one or more related queries for the document (808), for example, as described above with reference to FIG. 7. The popularity time change window is a re-occurring period of time during which a popularity of the query temporarily changes beyond a threshold amount and can be determined, for example, using conventional time series analysis techniques. In some implementations, the system compares a score derived from the popularity of the query, for example, the popularity of the query during a particular time period divided by the average popularity of the query, and compares that score to a threshold to determine whether there is a popularity time change window for the query.

In some implementations, rather than only adjusting the scores when the change in the popularity of the query exceeds a threshold, the system determines a score adjustment for all documents, where the impact of any one related query on the factor for the document is weighted by a measure of the query popularity, for example, the popularity during a time period corresponding to the current time period divided by the average popularity of the query.

The system ranks the document according to the scores and adjusted scores (810), for example, as described above with reference to FIG. 7. In some implementations, the system then presents the responsive documents according to the determined rank. For example, the system can send the ranked list of search results corresponding to the documents to a user device for presentation to the user.

Figure 9:
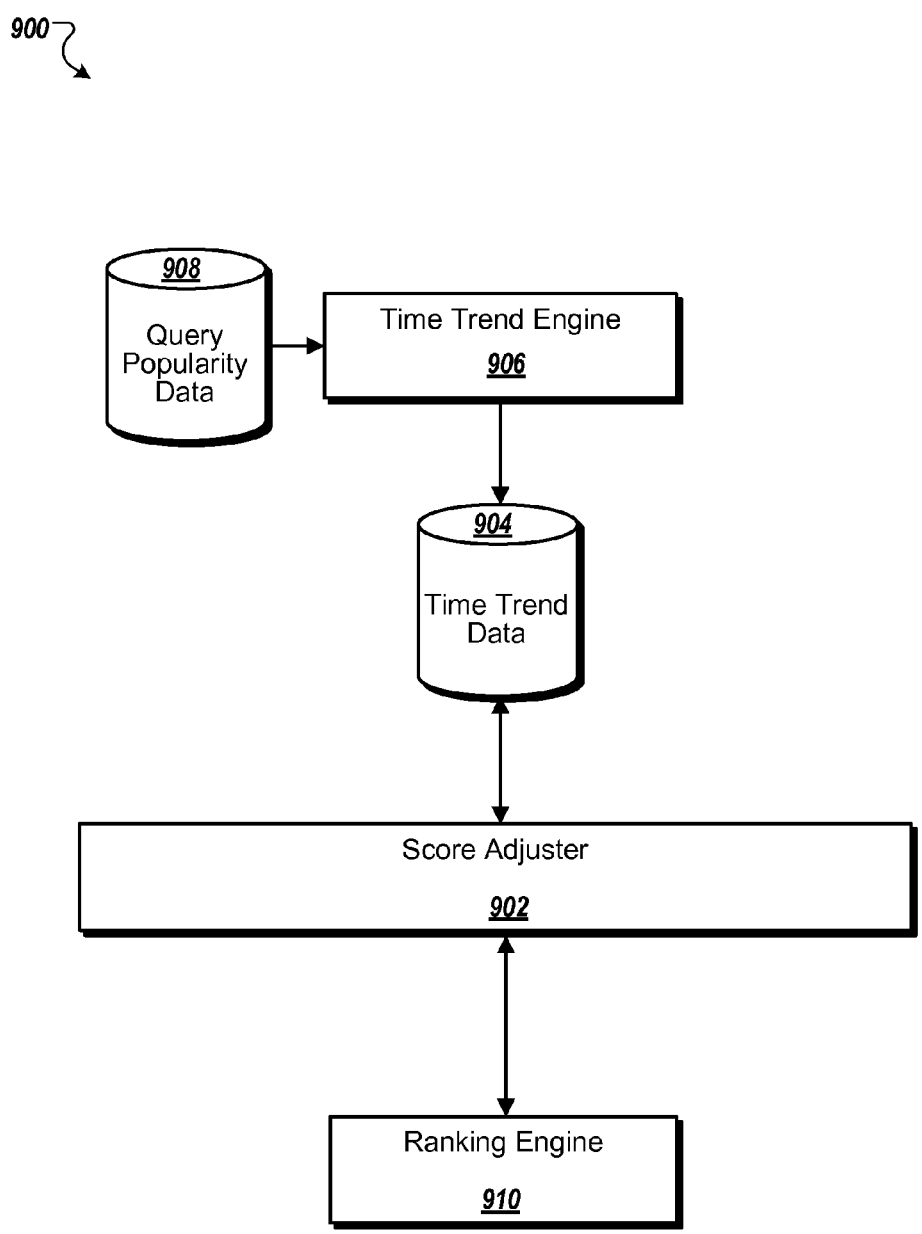
FIG. 9 illustrates an example system that includes another example score adjuster.

FIG. 9 illustrates an example system 900 that includes a score adjuster 902. The score adjuster 902 is an example component of the rank modifier engine 256 described above with reference to FIG. 2, and can be used instead of or in addition to the score adjusters 402 and 702 described above with reference to FIGS. 4 and 7. The score adjuster 902 determines score adjustments for documents responsive to a submitted query according to time trend data 904 generated by a time trend engine 906 from query popularity data 908. The score adjustments are then provided to ranking engine 910.

The time trend engine 906 receives the query popularity data 908 and processes the query popularity data to build a table storing time trend data 904. The query popularity data 908 is described in more detail above with reference to FIG. 7.

The time trend engine 906 analyzes the query popularity data 908 to identify one or more recurring queries. Each recurring query is a query that has multiple spikes in popularity over a period time. The period of time can be, for example, a year or a month. Data from multiple periods of time can be aggregated in the query popularity data 908. For example, the data from multiple years can be aggregated by period of time (date, month, etc.), as described above with reference to FIG. 7. A spike in popularity occurs when the popularity of a query temporarily increases beyond a threshold amount.

For example, the query "playoff schedule" can be associated with spikes in popularity during January, April, and October (corresponding to the playoff season for the National Football League, National Basketball Association, and Major League Baseball, respectively), and therefore can be identified as a recurring query.

The time trend engine 904 then identifies one or more extended queries for each recurring query. Each extended query includes each term of the recurring query and one or more additional terms. For example, the time trend engine 904 can identify the extended queries "playoff schedule nfl," "playoff schedule nba," and "playoff schedule mlb" for the recurring query "playoff schedule."

The time trend engine 904 can identify the extended queries using various methods. In some implementations, the extended queries are query refinements of the recurring queries. Query refinements are described in more detail above.

The time trend engine 904 then adds entries to the time trend data 904 for each of the recurring queries. The time trend engine 904 can generate multiple entries for each recurring query. Each entry corresponds to a recurring query and a particular period of time (e.g., two weeks). The entry associates the recurring query and a particular period of time with one of the extended queries.

The extended query associated with the recurring query and the period of time is the extended query that is the most popular during the period of time. In some implementations, the time trend engine 904 selects the most popular query by calculating a score for each extended query for the time period, and then selecting the extended query with the highest score. For example, if query popularity is measured by number of times queries are submitted, the score for an extended query e, for recurring query r during time period t can be calculated according to the following formula:

$\text{score}(e) = $ number of times query $e$ is submitted during time period $t$/number of times query $r$ is submitted during time period $t$ As another example, if query popularity is measured by the number of times users refine their queries to a particular query, the score for an extended query e, for recurring query r during time period t can be calculated according to the following formula:

$\text{score}(e) = $ number of times query refinement $e$ is submitted during time period $t$/number of times query $r$ is submitted during time period $t$ Query refinements are described in more detail above.

In some implementations, the entries associate at least some of the recurring queries and time periods with multiple extended queries, for example, when multiple extended queries have a score that is greater than a threshold for the period.

The score adjuster 902 determines an appropriate score adjustment for documents responsive to a query, and sends the score adjustment to the ranking engine 910 for use in scoring and ranking the documents. In some implementations, the score adjustment is an amount to adjust the score. In other implementations, the score adjustment is information to be used in determining the score. For example, the score adjuster 902 can indicate that the ranking engine should assign higher scores to documents that contain particular terms or that are associated with queries that contain particular terms.

The score adjuster 902 receives an original query and identifies an entry in the time trend table 908 corresponding to the original query and the time period during which the query was submitted. The entry associates the original query and the time period with an extended query, as described above. The score adjuster 902 then determines an appropriate score adjustment based on the extended query.

In some implementations, the score adjuster 902 instructs the ranking engine 903 to assign higher scores that it normally would to documents that include terms in the extended query but not in the original query.

In some implementations, the score adjuster 902 instructs the ranking engine 903 to assign higher scores than it normally would to documents that are associated with queries that include terms in the extended query that are not in the original query. The score adjuster 902 can determine which documents are associated with which queries using document-query pair data, described above with reference to FIG. 4.

In some implementations, the score adjuster 902 analyzes the documents and/or document-query pair data itself to determine the appropriate score adjustment, and provides the value of the score adjustment to the ranking engine 910. For example, the score adjuster 902 can adjust the scores of documents associated with queries or including terms in the extended query that are not in the original query by a factor derived from the popularity score for the extended query during the time period.

Figure 10:
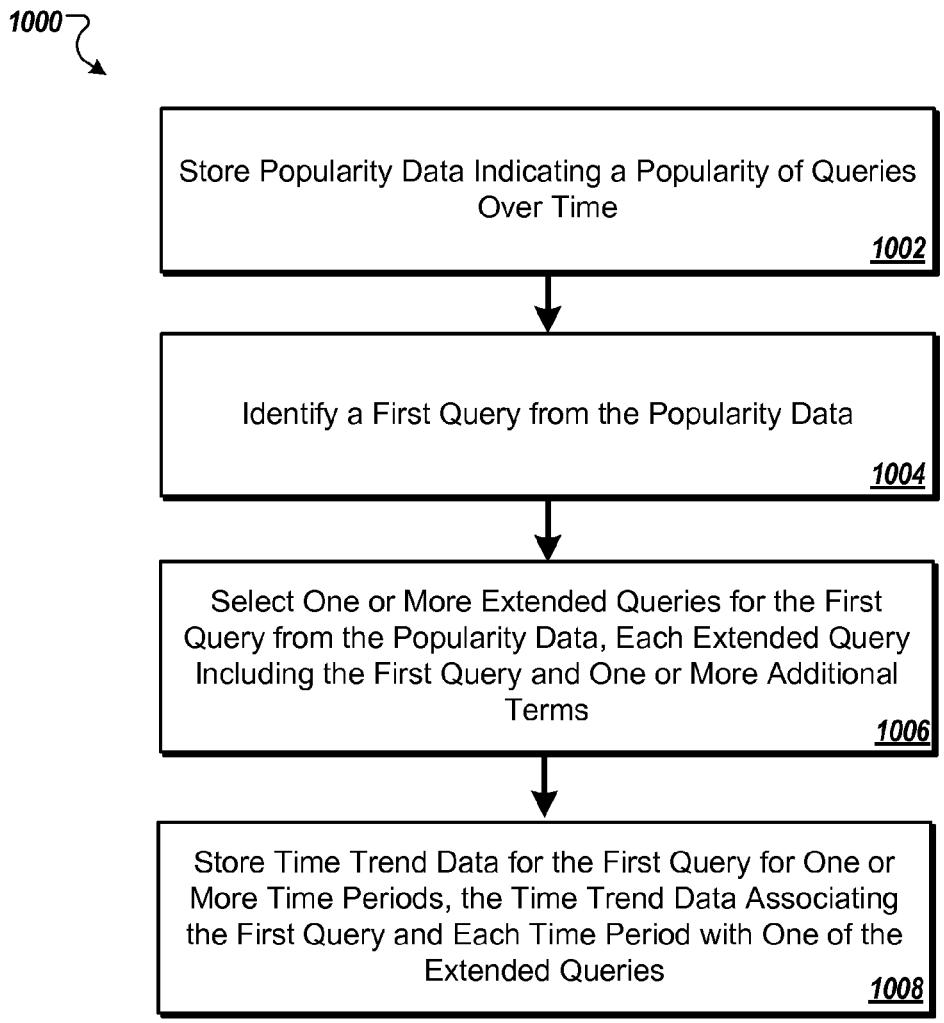
FIG. 10 illustrates an example technique for generating time trend data.

FIG. 10 illustrates an example technique 1000 for generating time trend data. For convenience, the example technique 1000 will be described in reference to a system that performs the technique 1000. The system can be, for example, the system 1000.

The system stores popularity data indicating a popularity of queries over time (1002), for example, as described above with reference to FIG. 9. The system identifies a first query from the popularity data (1004). In some implementations, the first query is a recurring query, as described above with reference to FIG. 9. The system stores time trend data for the first query for one or more time periods (1006). The data associates the first query and each of the time periods with one of the extended queries. The extended query for a given time period can be selected as described above with reference to FIG. 9.

Figure 11:
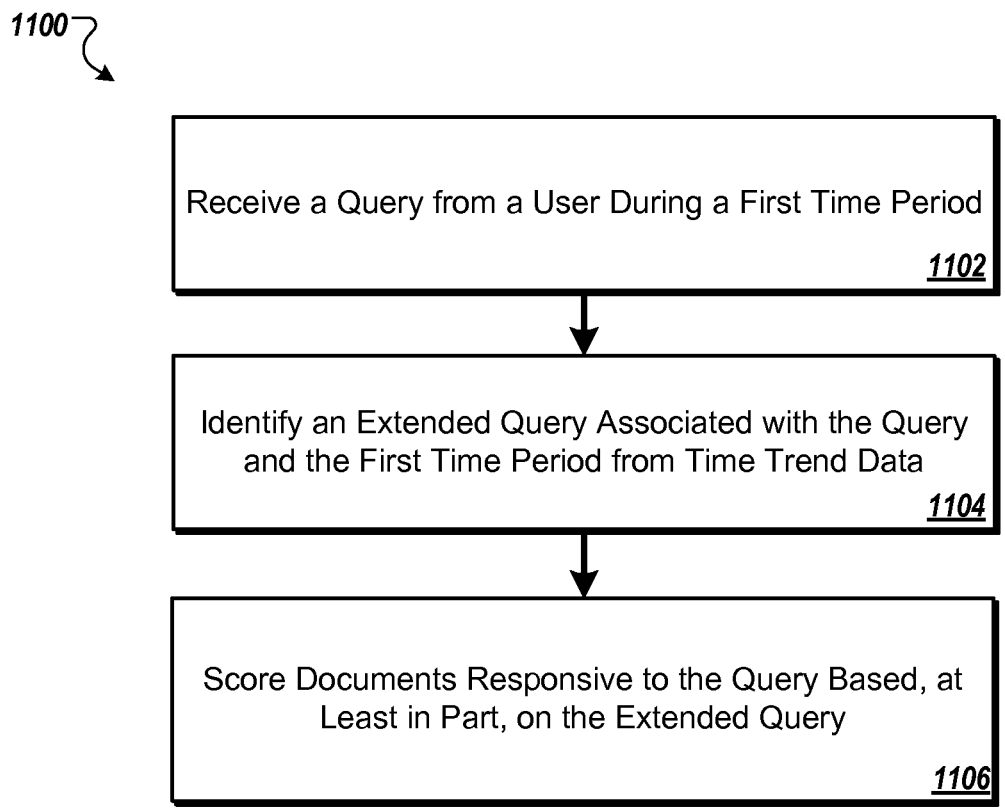
FIG. 11 illustrates an example technique for adjusting document scores based on time trend data.

FIG. 11 illustrates an example technique 1100 for adjusting document scores based on time trend data. For convenience, the example technique 1100 will be described in reference to a system that performs the technique 1100. The system can be, for example, the system 1000.

The system receives a query from a user during a first time period (1102). For example, the query can be received through a search system, as described above with reference to FIG. 2. The system identifies a first extended query associated with the query and the first time period from the time trend data (1104). For example, the system can retrieve the entry corresponding to the query and the first time period from the time trend data. The system scores documents responsive to the first query based, at least in part, on the first extended query. For example, the system can score the documents using a ranking engine as described above. In some implementations, the system provides additional information to the ranking engine based on the first extended query, for example, as described above with reference to FIG. 9. In some implementations, the system calculates and provides a score adjustment amount to the ranking engine, as described above with reference to FIG. 9.

Figure 12:
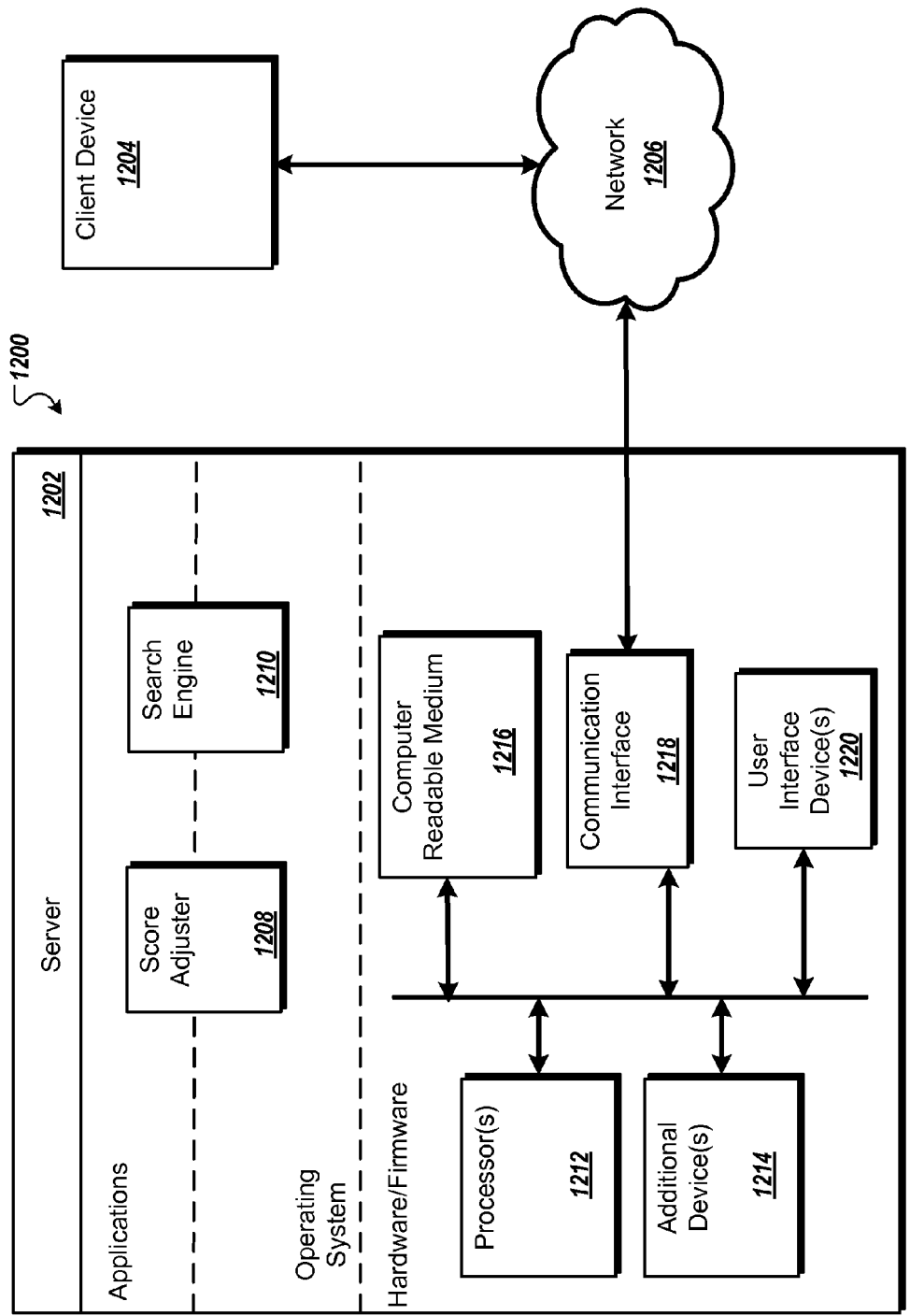
FIG. 12 illustrates an example architecture of a system.

FIG. 12 illustrates an example architecture of a system 1200. The system 1200 generally consists of a server 1202. The server is optionally connected to one or more client devices 1204 through a network 1206.

The server 1202 consists of one or more data processing apparatus. While only one data processing apparatus is shown in FIG. 12, multiple data processing apparatus can be used. The server includes various modules, e.g. executable software programs, including a score adjuster 1208 and a search engine 1210. Each module runs as part of the operating system on the server, runs as an application on the server, or runs as part of the operating system and part of an application on the server.

The score adjuster 1208 determines appropriate score adjustments for documents responsive to a query, for example, as described above with reference to FIGS. 4-11. For example, the score adjuster 1208 can be one or more of the score adjuster 402, the score adjuster 702, and the score adjuster 902 described above with reference to FIGS. 4, 7, and 9.

The search engine 1210 receives queries from users, processes the queries to identify and rank search results, and presents the ranked search results to users, for example, as described above with reference to FIG. 2.

The server 1202 can also have hardware or firmware devices including one or more processors 1212, one or more additional devices 1214, computer readable medium 1216, a communication interface 1218, and one or more user interface devices 1220. Each processor 1212 is capable of processing instructions for execution within the server 1202. In some implementations, the processor 1212 is a single-threaded processor. In other implementations, the processor 1212 is a multi-threaded processor. Each processor 1212 is capable of processing instructions stored on the computer readable medium 1216 or on a storage device such as one of the additional devices 1214. The server 1202 uses its communication interface 1218 to communicate with one or more computers, for example, over a network. Examples of user interface devices 1220 include a display, a camera, a speaker, a microphone, a tactile feedback device, a keyboard, and a mouse.

The server 1202 can store instructions that implement operations associated with the modules described above, for example, on the computer readable medium 1216 or one or more additional devices 1214, for example, one or more of a floppy disk device, a hard disk device, an optical disk device, or a tape device. In some implementations, the server 1202 also stores additional data, for example, associations between documents and queries, on the computer readable medium 1216 or one or more additional devices 1214.

The client device 1204 is connected to the server 1202 through the network 1206. Users submit search queries to the server 1202, view search results responsive to their queries received from the server, and select search results received from the server 1202 using client devices such as the client device 1204, for example, through a web-browser running on the computer.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying a plurality of documents responsive to a first query, and obtaining a respective score for each document of the plurality of documents, wherein each document is associated with a plurality of previously received related queries for which the document was responsive as a search result, and wherein the related queries match the first query;
   for each document:
      determining a respective age classification of each of the related queries associated with the document as new or old depending on whether one or more terms of the respective related query are temporal terms that provide a temporal meaning for the query; and
      adjusting the score for the document according to the respective age classifications of the related queries associated with the document, wherein adjusting the score for the document comprises:
         calculating a new count corresponding to a first count of the related queries associated with the document that are classified as new, and calculating an old count corresponding to a second count of the related queries associated with the document that are classified as old;
         classifying the document as new if the new count satisfies a threshold, otherwise, classifying the document as old if the old count satisfies a threshold;
         determining a positive adjustment that increases the score by a first factor when the document is a new document, wherein the first factor is determined from the new count; and
         determining a negative adjustment that decreases the score by a second factor when the document is an old document, wherein the second factor is determined from the old count; and
   ranking the plurality of documents according to the respective scores for the documents and the adjusted scores.

2. The method of claim 1 wherein the new count is a weighted count wherein each related query associated with the particular document that is classified as new is weighted by a weight derived from one or more quality of result statistics for the document and the related query.

3. The method of claim 1 wherein the old count is a weighted count wherein each old query is weighted by a weight derived from one or more quality of result statistics for the document and the old query.

4. The method of claim 1, wherein the temporal terms indicate a request for new information or for old information.

5. A system comprising:
   one or more computers programmed to perform operations comprising:
      identifying a plurality of documents responsive to a first query, and obtaining a respective score for each document of the plurality of documents, wherein each document is associated with a plurality of previously received related queries for which the document was responsive as a search result, and wherein the related queries match the first query;
      for each document:
         determining a respective age classification of each of the related queries associated with the document as new or old depending on whether one or more terms of the respective related query are temporal terms that provide a temporal meaning for the query; and
         adjusting the score for the document according to the respective age classifications of the related queries associated with the document, wherein adjusting the score for the document comprises:
            calculating a new count corresponding to a first count of the related queries associated with the document that are classified as new, and calculating an old count corresponding to a second count of the related queries associated with the document that are classified as old;
            classifying the document as new if the new count satisfies a threshold;
            classifying the document as old if the old count satisfies a threshold;
            determining a positive adjustment that increases the score by a first factor when the document is a new document, wherein the first factor is determined from the new count; and
            determining a negative adjustment that decreases the score by a second factor when the document is an old document, wherein the second factor is determined from the old count; and ranking the plurality of documents according to the respective adjusted scores for the documents.

6. The system of claim 5 wherein the new count is a weighted count wherein each related query associated with the particular document that is classified as new is weighted by a weight derived from one or more quality of result statistics for the document and the related query.

7. The system of claim 5 wherein the old count is a weighted count wherein each old query is weighted by a weight derived from one or more quality of result statistics for the document and the old query.

8. The system of claim 5, wherein the temporal terms indicate a request for new information or for old information.

9. A computer storage medium encoded with a computer program, the program comprising instructions that when executed by one or more computers cause the one or more computers to perform operations comprising:
  identifying a plurality of documents responsive to a first query, and obtaining a respective score for each document of the plurality of documents, wherein each document is associated with a plurality of previously received related queries for which the document was responsive as a search result, and wherein the related queries match the first query;
  for each document:
    determining a respective age classification of each of the related queries associated with the document as new or old depending on whether one or more terms of the respective related query are temporal terms that provide a temporal meaning for the query; and
    adjusting the score for document according to the respective age classifications of the related queries associated with the document, wherein adjusting the score for the document comprises:
      calculating a new count corresponding to a first count of the related queries associated with the document that are classified as new, and calculating an old count corresponding to a second count of the related queries associated with the document that are classified as old;
      classifying the document as new if the new count satisfies a threshold;
      classifying the document as old if the old count satisfies a threshold;
      determining a positive adjustment that increases the score by a first factor when the document is a new document, wherein the first factor is determined from the new count; and
      determining a negative adjustment that decreases the score by a second factor when the document is an old document, wherein the second factor is determined from the old count; and
  ranking the plurality of documents according to the respective adjusted scores for the documents.

* * * * *